United States Patent
Baker et al.

(10) Patent No.: US 8,307,371 B2
(45) Date of Patent: Nov. 6, 2012

(54) METHOD FOR EFFICIENT UTILIZATION OF PROCESSORS IN A VIRTUAL SHARED ENVIRONMENT

(75) Inventors: Barry M. Baker, New York, NY (US); Robert A. Blackburn, Hopewell Junction, NY (US); Mark R. Gambino, Brewster, NY (US); Leslie F. Sutton, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 1436 days.

(21) Appl. No.: 11/313,990

(22) Filed: Dec. 20, 2005

(65) Prior Publication Data

US 2007/0143738 A1     Jun. 21, 2007

(51) Int. Cl.
*G06F 9/50* (2006.01)
(52) U.S. Cl. ............ 719/310; 711/141; 718/1; 718/102; 718/104
(58) Field of Classification Search ........................ 718/1
See application file for complete search history.

(56) References Cited

U.S. PATENT DOCUMENTS

| | | | |
|---|---|---|---|
| 4,843,541 A | 6/1989 | Bean et al. | 364/200 |
| 6,226,734 B1 | 5/2001 | Kleinsorge et al. | 712/13 |
| 6,247,109 B1 | 6/2001 | Kleinsorge et al. | 712/13 |
| 6,260,068 B1 | 7/2001 | Zalewski et al. | 709/226 |
| 6,289,369 B1 * | 9/2001 | Sundaresan | 718/103 |
| 6,574,748 B1 * | 6/2003 | Andress et al. | 714/11 |
| 6,633,897 B1 * | 10/2003 | Browning et al. | 718/103 |
| 6,931,391 B2 | 8/2005 | Tang et al. | 707/2 |
| 7,318,128 B1 * | 1/2008 | Dice | 711/151 |
| 7,466,316 B1 * | 12/2008 | Alben et al. | 345/502 |
| 2003/0055864 A1 * | 3/2003 | Armstrong et al. | 709/107 |
| 2003/0208642 A1 | 11/2003 | Desai et al. | 710/1 |
| 2004/0221136 A1 * | 11/2004 | Stravers | 712/34 |
| 2007/0079308 A1 * | 4/2007 | Chiaramonte et al. | 718/1 |

* cited by examiner

*Primary Examiner* — S. Sough
*Assistant Examiner* — Syed Roni
(74) *Attorney, Agent, or Firm* — Cantor Colburn LLP; Steven Chiu

(57) ABSTRACT

A method for selecting a processor to be acquired in a virtual, shared computing environment includes initiating a first selection phase to attempt to acquire a last relinquished processor of the shared computing environment, and initiating a second selection phase in the event of a failure of the first selection phase in acquiring the last relinquished processor. The second selection phase further includes a round-robin selection process for presently relinquished processors.

14 Claims, 5 Drawing Sheets

METHOD FOR EFFICIENT UTILIZATION OF PROCESSORS IN A VIRTUAL SHARED ENVIRONMENT

BACKGROUND

The present invention relates generally to logical partitioning of computer systems and, more particularly, to a method for efficient utilization of processors in a virtual shared environment.

In a single physical computer system having multiple physical processors with logical resource partitioning capabilities (e.g., U.S. Pat. No. 4,843,541), it is possible to have two or more operating systems (OSs) simultaneously executing on the physical processors. Two higher-level configurations generally exist when defining the use of the available processors by the logical partitions: dedicated or shared. A partition that makes use of dedicated processors signifies that physical processors are dedicated to a particular partition. In other words, a dedicated physical processor handles the processing for one specific logical partition. FIG. 1 illustrates a single system configuration that features dedicated partitions.

On the other hand, a partition that makes use of shared processors means that the physical processors can be assigned in partial processor increments to particular partitions. An example of such a shared partition configuration 200 is shown in FIG. 2, where the two logical partitions, combined, contain a total of five logical processors (having varying percentages of a complete physical processor) even though there are only four physical processors present in the computer system.

In either the dedicated or shared configurations, a partition can define both a minimum number of processors (and partial processors for the shared case) and a maximum number of processors, such that the sum of each of the minimum values (including partial processor increments) of each of the partitions defined cannot exceed the number of actual physical processors. For example, in the dedicated configuration of FIG. 1, under certain logical resource partitioning facilities, Partition 1 would be defined as having a minimum of three processors (full) but it could have a maximum of four (wherein the fourth processor would only be usable if Partition 2 is not active). Moreover, Partition 2 would be defined to have a minimum of one processor (full) and could be defined to have a maximum of four processors (full), if Partition 1 were not active.

With regard to the shared configuration of FIG. 2, the same principles are also applicable. For example, Partition 1 includes of a minimum of three logical processors (wherein at least one of them is not the equivalent of a "full" processor), while Partition 2 includes of a minimum of two logical processors (wherein at least one of them is not the equivalent of a full processor). If this was not the case, and each partition only consisted of full processors, then the two partitions would not be able to coexist on the computer system since the systems only contains four full physical processors.

In both FIGS. 1 and 2, there exists a layer that separates the logical partitioning from the physical resources, which is referred to hereinafter as a "hypervisor." As is known in the art, a hypervisor layer can provide the virtualization of any number of different types of resources found in a computer system and can provide for various management functions. As used herein, the term "hypervisor" specifically refers to the virtualization and partitioning of the available physical processors.

When operating in a shared environment such as shown in FIG. 2, programming system services may be provided (dependent on the specifics of the computer system) to each of the OSs that are operating in the partitions by the hypervisor and the system itself. These system services allow for the acquiring and relinquishing of the available processors. Depending on the specific requirements of the individual OS, each OS can utilize these exposed system services in differing ways. For example, an OS that contains a strict response time design constraint may not be permitted to relinquish a processor on its own accord, and will thus always rely on the hypervisor to take a processor away based solely on the partition definitions. Although such a constraint makes sense for the singular OS instance, it does not ensure the efficient utilization of the available resources of the entire computer system across operating OS instances.

To address this concern, certain OS instances attempt to utilize the exposed system services to relinquish a processor when a low utilization (of processing capability) is detected, and also attempt to acquire a processor when a low-to-high utilization transition is detected. The specific internals of a particular OS will dictate how the low utilization and low-to-high utilization transitions are detected, the mechanics of which are not discussed in further detail hereinafter. One of the more common methods for selecting a particular processor to acquire is to simply select all of the system processors and attempt to acquire each one of them, as opposed to selecting a single specific processor. However, in certain instances, this can actually be a less efficient approach as compared to relying solely on the hypervisor to manage the processor resources, due to the increased use of the hypervisor by the requesting OS. Furthermore, this blanket approach could also result in several of the acquired processors becoming active with no application workload to process, as other previously acquired processors have already begun to process the workload.

Another possibility is to maintain a list of available processors and use a round-robin approach to select the next processor to acquire whenever a low-to-high utilization transition is detected. Although this approach represents somewhat of an improvement over the first approach of attempting to acquire all available processors, it is still not ideal since a rudimentary round-robin search may attempt to acquire a processor that provides a unique functionality with respect to available processors, and would thus not be an appropriate choice for acquisition.

Accordingly, it would be desirable to be able to more efficiently select a processor following a low-to-high transition a in a virtual, shared processing environment.

SUMMARY

The above discussed drawbacks and deficiencies of the prior art are overcome or alleviated by a method for selecting a processor to be acquired in a virtual, shared computing environment. In an exemplary embodiment, the method includes initiating a first selection phase to attempt to acquire a last relinquished processor of the shared computing environment, and initiating a second selection phase in the event of a failure of the first selection phase in acquiring the last relinquished processor. The second selection phase further includes a round-robin selection process for presently relinquished processors.

In another embodiment, a storage medium includes a machine readable computer program code for selecting a processor to be acquired in a virtual, shared computing environment, and instructions for causing a computer to implement a method. The method further includes initiating a first selection phase to attempt to acquire a last relinquished processor of the shared computing environment, and initiating a second selection phase in the event of a failure of the first selection phase in acquiring the last relinquished processor, the second selection phase further including a round-robin selection process for presently relinquished processors.

BRIEF DESCRIPTION OF THE DRAWINGS

Referring to the exemplary drawings wherein like elements are numbered alike in the several Figures.

DETAILED DESCRIPTION

Figure 1:
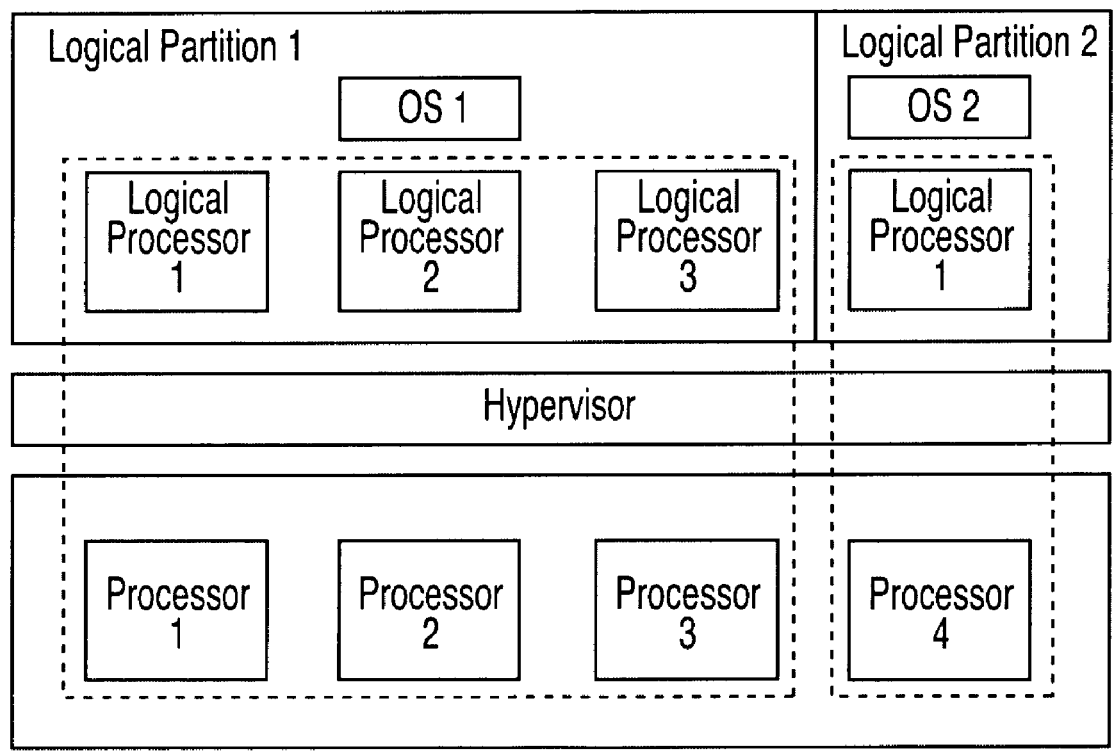
FIG. 1 is a schematic diagram of a partitioned computer system having processing resources assigned to dedicated logical partitions.
Figure 2:
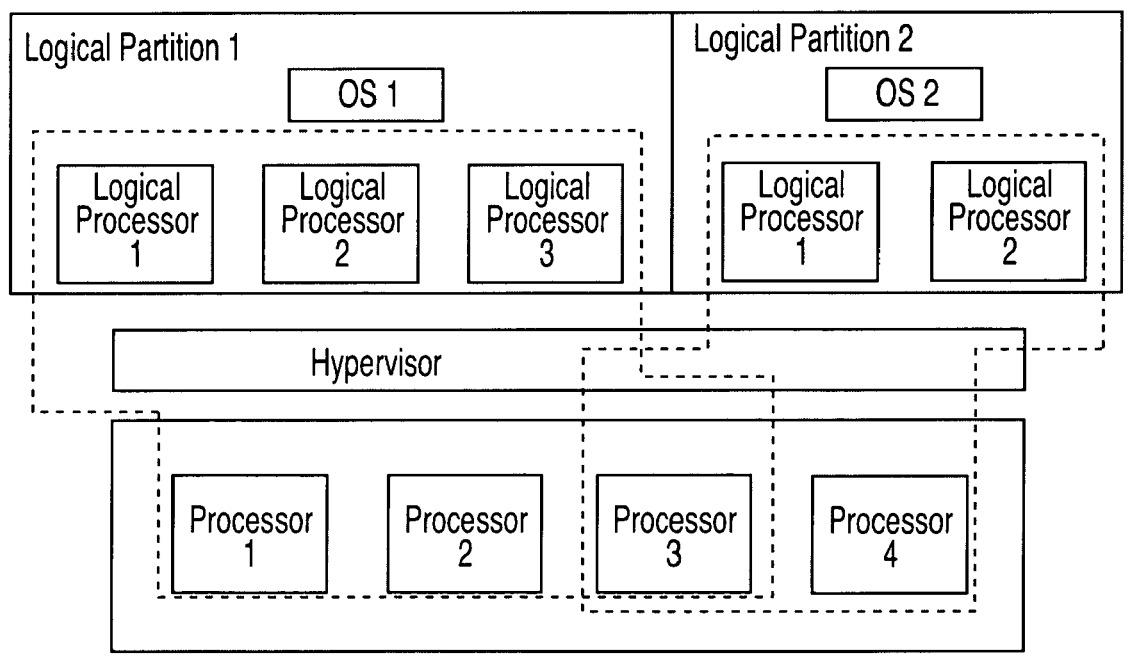
FIG. 2 is a schematic diagram of a partitioned computer system having processing resources shared by logical partitions.

Disclosed herein is a method for the efficient selection of a processor to acquire in a virtual, shared environment. Generally stated, the methodology utilizes a two-phase selection process, the first phase of which seeks to reuse or acquire the last relinquished processor (i.e., the most recently relinquished processor). In selecting the last relinquished processor to acquire, there exists the highest likelihood of retrieving the cache of the acquired processor that contains data still valid with respect to the requesting OS. Where each of the OS instances present in a shared environment first attempts to acquire its last relinquished process, a decreased utilization of the entire computer system will result due to a combination of decreased hypervisor overhead and positive cache effects. This decrease in hypervisor utilization will in turn allow for an increased capacity to process the application workload.

In the event that the identification of the last relinquished processor is not defined or is no longer available (as will be described in further detail hereinafter), a second selection phase may then be implemented. This second phase includes the selection of a processor in an improved, extensible round-robin fashion that is based largely on the specific requirements of the implementing OS. By selecting a processor according to such a two-phase methodology (as opposed to selecting and attempting to acquire all processors, or through a simple, non-extensible round-robin fashion), a decrease in overall utilization of the computer system will be achieved.

It should be understood at this point that the exemplary method embodiments disclosed herein are directed toward efficient selection and utilization (by the hosted operating systems) of the processors in a computer system that includes logical shared partitioning of particular resources, and are not specifically concerned with the particular mechanisms that could be used to detect both the low utilization and low-to-high utilization transition conditions. In other words, the present selection methodology may be used in conjunction with any number of acceptable ways in the art for defining and distinguishing between low utilization states (of processing resources), high utilization states and the transitions therebetween.

In the exemplary embodiments presented herein, various variables and services are defined as references for the disclosed selection methodology. These references include, for example, the processor shared variables "last_relinquished" and "last_acquired". The last_relinquished variable for a given OS stores an identifier of the last processor that relinquished itself to the hypervisor, and can have as possible values: [NULL, 1, 2, 3, ... n] where n is the total number of processors available for use by the logical partition in which the particular OS instance is operating. Similarly, the last_acquired variable for a given OS stores an identifier of the last processor that was acquired via the selection method described hereinafter. It can have as possible values [NULL, 1, 2, 3, ... n] where n is the number of processors available for use by the logical partition in which the particular OS instance is operating. The relinquished_list variable is also used for each processor that identifies whether that particular processor has been relinquished. For example, the designation relinquished_list[3]=1 can signify that processor number 3 has been relinquished.

In addition, exemplary hypervisor services include "Acquire [n]" and "Relinquish [n]". The Acquire [n] service takes as input [n] the identifier of the processor that is requested to resume processing on behalf of the invoking OS instance, while the Relinquish [n] service takes as input [n] the identifier of the processor that is to be relinquished to the hypervisor on behalf of the invoking OS instance.

Figure 3:
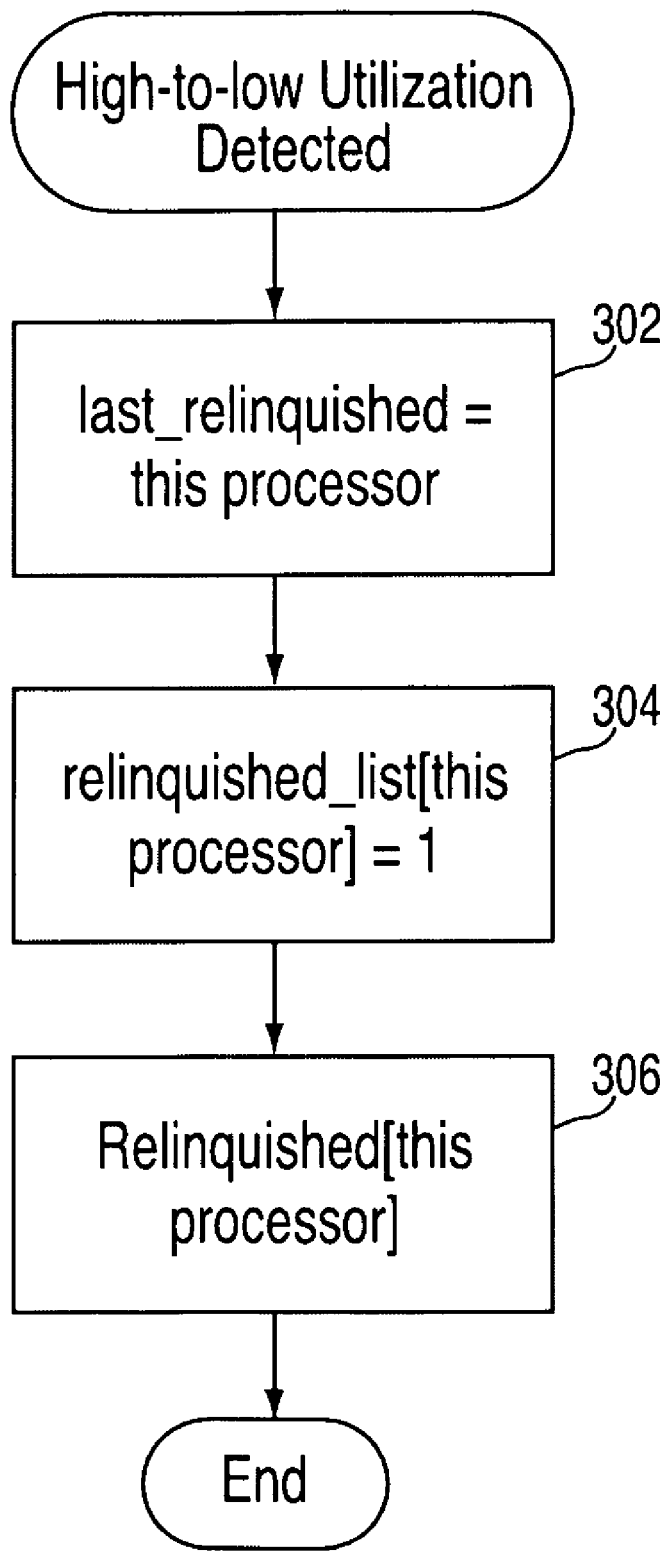
FIG. 3 is a flow diagram illustrating an exemplary high-to-low utilization processing that may be implemented for initially identifying and defining the last relinquished processor, in accordance with an embodiment of the invention.

Prior to the detailed illustration of the present two-phase selection process, FIG. 3 is a flow diagram 300 illustrating exemplary high-to-low utilization processing that may be implemented for initially identifying and defining the last relinquished processor. Again, the particular manner of determining a high-to-low utilization of processor resources is not the subject of the present disclosure, and can be detected according to any number of acceptable definitions or criteria. Regardless of how this is detected, once a high-to-low utilization is in fact detected for a given processor, the shared variable "last_relinquished" is set to the value corresponding to the identification of that particular processor, as shown at block 302.

Then, as shown at block 304, the variable "relinquish_list" for the released processor is set to a logical true condition to indicate that such processor is now on a list of relinquished processors, as shown at block 304. It will be noted that, depending upon the particular operating system, certain processors may be excluded from the selection process by not allowing those processors to be included within the list of acceptable values for last_relinquished, and by not allowing them to be included on the relinquished list (e.g., where processor "x" is to be excluded from the selection process, the value "x" is not valid for the variable last_relinquished, and relinquished_list[x]=0 in all cases). This can be considered to be an extensibility feature of the selection process. However, assuming the processor in the OS may be relinquished, after setting the last_relinquished and relinquished_list variables, the OS invokes a relinquish request to the hypervisor for that processor, as shown in block 306.

Figure 4:
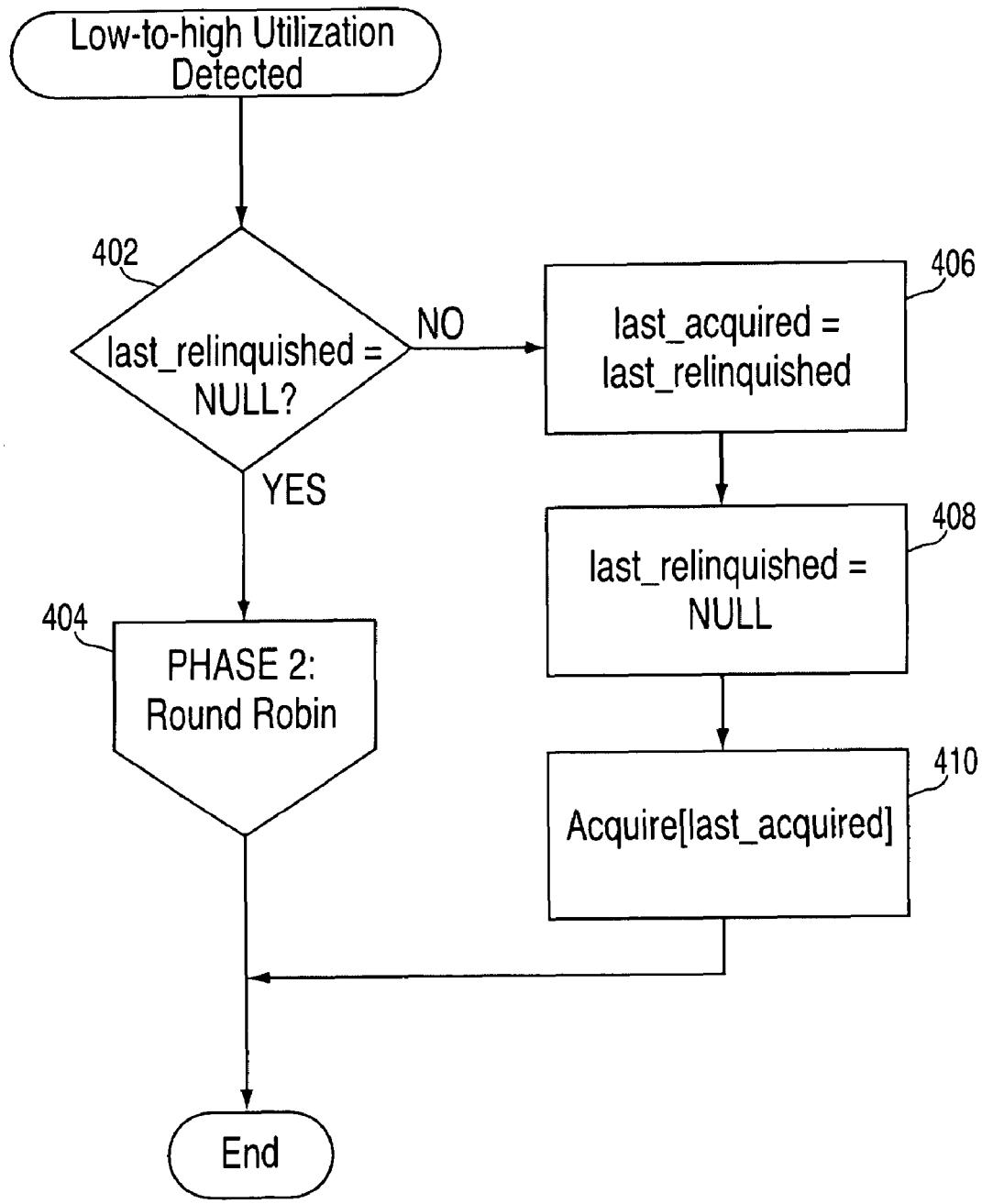
FIG. 4 is a flow diagram illustrating a first selection phase that attempts to acquire the last relinquished processor, in accordance with an embodiment of the invention.
Figure 5:
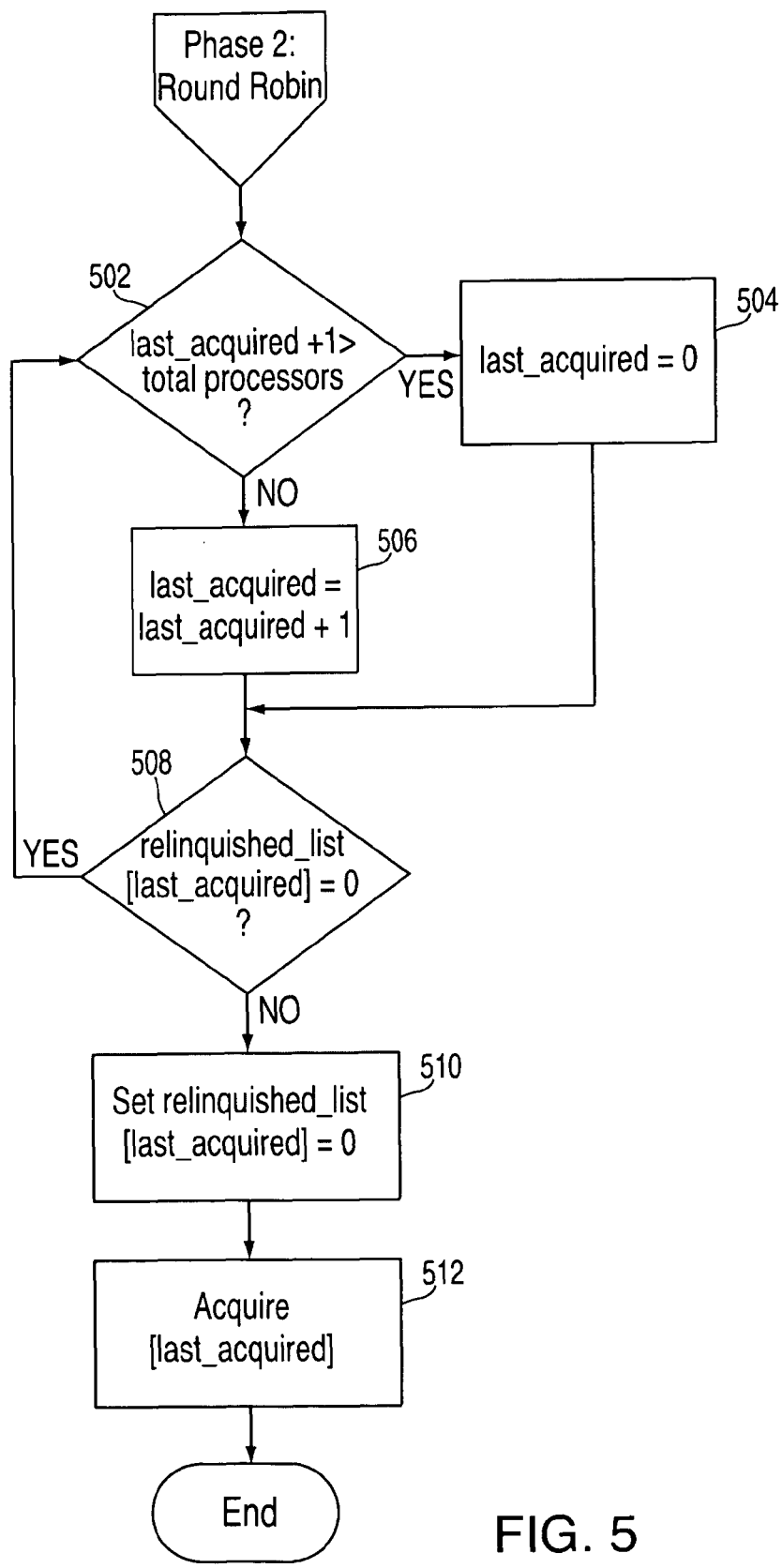
FIG. 5 is a flow diagram illustrating a second selection phase that implements an extensible round-robin selection process in the event the last relinquished processor is unavailable, in accordance with an embodiment of the invention.

Referring generally now to FIGS. 4 and 5, the two-phase selection process is entered upon the detection of a low-to-high utilization condition for a given processor in a system. Again, the selection process generally includes a first phase that attempts to use (acquire) the last_relinquished processor, and if this is unsuccessful the second phase using the OS specific round-robin approach is entered. The operation of the first phase is illustrated by the flow diagram 400 of FIG. 4. Following the detection of a low-to-high utilization situation (again the details of which are not the subject of the present disclosure), it is determined at decision block 402 whether the value of last_relinquished is NULL. Stated another way, this inquiry of the decision block attempts to ascertain the identity of the last relinquished processor. If the value of last_relinquished=NULL, then the first preferred scenario (i.e., acquiring the last relinquished processor) has failed, and the process proceeds to the second phase as shown at block 404, and the first phase is ended. This may be the case, for example, following the first low-to-high utilization condition after system power up, prior to a time at which any processor has been relinquished. Another possibility for failing to identify a last relinquished processor (i.e., last_relinquished=NULL) is explained below.

On the other hand, assuming the value of last_relinquished is not NULL following a detected low-to-high utilization, the first phase then proceeds to block 406 where the variable last_acquired is set to the current (non-NULL) value of last_relinquished. Then, in block 408, the variable last_relinquished is then set to NULL. Thus, once the first phase attempts to acquire the last relinquished processor, then that processor is no longer considered to be the last relinquished processor regardless of whether the hypervisor ultimately grants the acquire request. As then shown at block 410, the OS invokes an acquire request to the hypervisor for that processor. Since the first phase was successfully run in this example (i.e., the last relinquished processor was identified and requested), the second phase is not entered in this iteration of the process.

Because the processor-shared variable last_relinquished is set to NULL in block 408, it is therefore possible that this value could still be NULL the next time a low-to-high utilization is detected. That is, upon the next detection of a low-to-high utilization, no intervening high-to-low utilization has been detected (FIG. 3) and thus no setting of the variable last_relinquished to a non-NULL value has occurred.

The last_relinquished variable may be considered to be a one-deep queue. Immediately prior to issuing a Relinquish [ ] request for a processor that has detected a low utilization situation, the identifier of the processor to be relinquished is stored (using block-concurrent operations) in the last_relinquished variable, as will be recalled from FIG. 3. When a processor resumes processing on behalf of a specific OS instance (either through an Acquire [ ] request to the hypervisor or simply by the hypervisor on its own accord), the last_relinquished variable is checked and if it is equal to the resuming processor, then it stores a NULL in the last_relinquished variable to indicate to the other operating processors that this specific processor has resumed processing and that no other processor should use the Acquire [ ] service on it.

Referring now to the flow diagram 500 of FIG. 5, where the second phase has been entered as a result of last_relinquished=NULL following a low-to-high utilization detection, an extensible round-robin routine is executed to select a processor from those available from the relinquished_list and call the Acquire [ ] service of the hypervisor. A conventional round-robin routine would simply begin with the first processor upon the first entry into the second phase, thereafter beginning with the second processor upon the next entry into phase 2. This pattern would continue until the list of processors has been exhausted, in which case the first processor is again selected and the round-robin continues.

In the present embodiment, the second phase begins at decision block 502 to check whether the current location of the last acquired processor is at the end of the processor list. In order for proper operation of the extensible round-robin phase, block-concurrent operations are used to keep track of the current location. Thus if last_acquired+1 is greater than the total number of processors, then this variable is at the end of the list, and the value of last_acquired is then reset to zero, as shown at block 504. An extensible aspect of the second phase is that, depending upon the particular characteristics of the OS, the resetting of the last_acquired variable may be tailored to be biased to a particular processor (instead of the first on the list). For example, an embodiment of the round-robin phase can exclude the first processor from the round-robin when the system is not a true SMP (i.e., certain system functions must be performed on a specific processor). In addition, other embodiments may reset the current round-robin position to the nominal starting round-robin position whenever the first phase was successful at selecting the last relinquished processor to acquire. Further, the round-robin processing may also be exited and restarted based on certain defined system events.

If the current round-robin position is not at the end of the list, then the last_acquired value is instead incremented by one as shown in block 506, and the phase proceeds to decision block 508 to determine if the current block identified by the round-robin is in fact on the relinquished list. That is, block 508 checks to see whether the value of relinquished_list for the particular processor currently designated by the last_acquired variable is equal to zero. This would signify that this processor is currently not on the relinquished list. If this is the case, then the round-robin phase returns back to block 502 for further resetting and/or incrementing of last_acquired. Still another extensible aspect of this phase is that certain processors can be effectively excluded from the relinquished list by permanently designating the relinquished_list variable for that processor to be equal to zero. Finally, if it is determined that the processor identified by the current value of last_acquired is on the relinquished list, the relinquished_list variable for that processor will be set to zero at block 510 (effectively removing it from the relinquished list), and the second phase then proceeds to block 512, where the OS invokes an acquire request to the hypervisor for that processor.

In view of the above, the present method embodiments may therefore take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits. A technical effect of the executable instructions is to implement the exemplary method described above and illustrated in FIGS. 3 through 5.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for selecting a physical processor to be acquired in a virtual, shared computing environment having a plurality of operating systems executing within logical partitions, and separated from a plurality of available physical processors by a hypervisor that provides virtualization and partitioning of the available physical processors, the method comprising:

for a given requesting operating system, initiating a first selection phase to attempt to acquire a last relinquished physical processor of the requesting operating system within the shared computing environment, the last relinquished physical processor corresponding to a most recently relinquished physical processor previously in use by requesting the operating system in the shared computing environment, so as to achieve a highest likelihood of retrieving a cache containing data still valid with respect to the requesting operating system;

wherein the first selection phase further comprises:

determining whether a first variable assigned to track the identity of the last relinquished physical processor has a NULL value, the first variable having, as possible values, n, where the n is a total number of the plurality of physical processors that are available for use within the logical partition in which the requesting system is operating;

automatically initiating a second selection phase only in the event of a failure to acquire the last relinquished physical processor by the first selection phase, wherein the value of the first variable is NULL; and in the event the value of the first variable is not NULL, setting the value of a second variable assigned to track the identity of a last acquired physical processor to the value of the first variable, thereafter setting the value of the first variable to NULL, and invoking an acquire request to a hypervisor for the processor corresponding to a new value of the second variable, the second variable having, as possible values, m, where the m is the number of processors available for use by the logical partition in which a particular operating system instance is operating;

wherein the second selection phase further comprises a round-robin selection process for presently relinquished physical processors.

2. The method of claim 1, wherein the first selection phase is initiated following a detected low to high utilization condition of at least one physical processor in the shared computing environment.

3. The method of claim 1, further comprising:

setting the value of the first variable to the identity of a given physical processor within the shared computing environment upon detection of a high to low utilization condition of the given physical processor, the first variable comprising a shared variable with respect to each physical processor in the shared computing environment;

setting a third variable, used for each physical processor, to reflect that the given physical processor has been relinquished; and invoking a relinquish request to the hypervisor to relinquish the given physical processor.

4. The method of claim 1, wherein the second selection phase further comprises:

determining whether the value of the second variable corresponds to a last physical processor of the total number of physical processors within the shared computing environment, and updating the value of the second variable in such case by resetting to correspond to a next physical processor to be evaluated in the round-robin process, otherwise updating the value of the second variable by incrementing the value thereof by one;

determining whether the physical processor corresponding to the updated value of the second variable is currently on a list of relinquished physical processors; and invoking an acquire request to a hypervisor for the physical processor corresponding to the updated value of the second variable.

5. The method of claim 4, further comprising reiterating the second selection phase in the event the physical processor corresponding to the updated value of the second variable is not currently on the list of relinquished physical processors.

6. The method of claim 5, further comprising implementing resetting of the second variable in a manner that bypasses specifically designated physical processors.

7. The method of claim 6, further comprising excluding the specifically designated physical processors from appearing on the list of relinquished processors.

8. A storage medium, comprising:

a machine readable computer program code for selecting a physical processor to be acquired in a virtual, shared computing environment having a plurality of operating systems executing within logical partitions, and separated from a plurality of available physical processors by a hypervisor that provides virtualization and partitioning of the available physical processors; and instructions for causing a computer to implement a method, the method further comprising:

for a given requesting operating system, initiating a first selection phase to attempt to acquire a last relinquished physical processor of the requesting operating system within the shared computing environment, the last relinquished physical processor corresponding to a most recently relinquished physical processor previously in use by requesting the operating system in the shared computing environment, so as to achieve a highest likelihood of retrieving a cache containing data still valid with respect to the requesting operating system;

wherein the first selection phase further comprises:

determining whether a first variable assigned to track the identity of the last relinquished physical processor has a NULL value, the first variable having, as possible values, n, where the n is a total number of the plurality of physical processors that are available for use within the logical partition in which the requesting system is operating;

automatically initiating a second selection phase only in the event of a failure to acquire the last relinquished physical processor by the first selection phase, wherein the value of the first variable is NULL; and in the event the value of the first variable is not NULL, setting the value of a second variable assigned to track the identity of a last acquired physical processor to the value of the first variable, thereafter setting the value of the first variable to NULL, and invoking an acquire request to a hypervisor for the processor corresponding to a new value of the second variable, the second variable having, as possible values, m, where the m is the number of processors available for use by the logical partition in which a particular operating system instance is operating;

wherein the second selection phase further comprises a round-robin selection process for presently relinquished physical processors.

9. The storage medium of claim 8, wherein the first selection phase is initiated following a detected low to high utilization condition of at least one physical processor in the shared computing environment.

10. The storage medium of claim 8, further comprising:
setting the value of the first variable to the identity of a given physical processor within the shared computing environment upon detection of a high to low utilization condition of the given physical processor, the first variable comprising a shared variable with respect to each physical processor in the shared computing environment;
setting a third variable, used for each physical processor, to reflect that the given physical processor has been relinquished; and
invoking a relinquish request to the hypervisor to relinquish the given physical processor.

11. The storage medium of claim 8, wherein the second selection phase further comprises:
determining whether the value of the second variable corresponds to a last physical processor of the total number of physical processors within the shared computing environment, and updating the value of the second variable in such case by resetting to correspond to a next physical processor to be evaluated in the round-robin process, otherwise updating the value of the second variable by incrementing the value thereof by one;
determining whether the physical processor corresponding to the updated value of the second variable is currently on a list of relinquished physical processors; and
invoking an acquire request to a hypervisor for the physical processor corresponding to the updated value of the second variable.

12. The storage medium of claim 11, further comprising reiterating the second selection phase in the event the physical processor corresponding to the updated value of the second variable is not currently on the list of relinquished physical processors.

13. The storage medium of claim 12, further comprising implementing resetting of the second variable in a manner that bypasses specifically designated physical processors.

14. The storage medium of claim 13, further comprising excluding the specifically designated physical processors from appearing on the list of relinquished physical processors.

* * * * *